March 25, 1969 — E. R. BRASTOW ET AL — 3,434,353
RATE GYROSCOPE
Filed Sept. 21, 1965
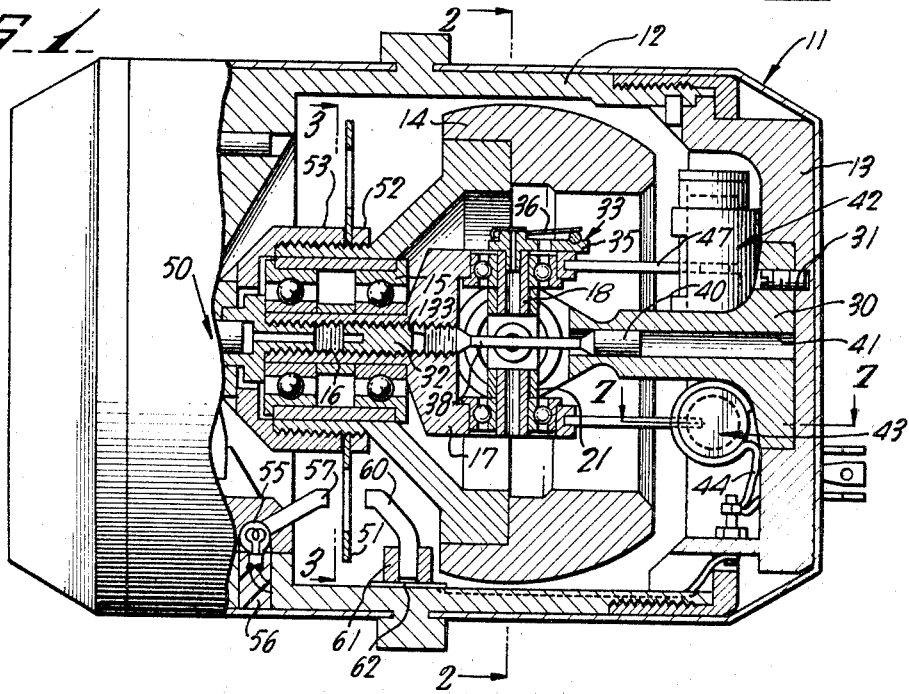
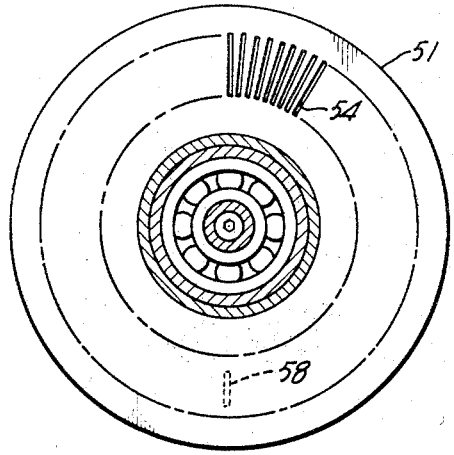
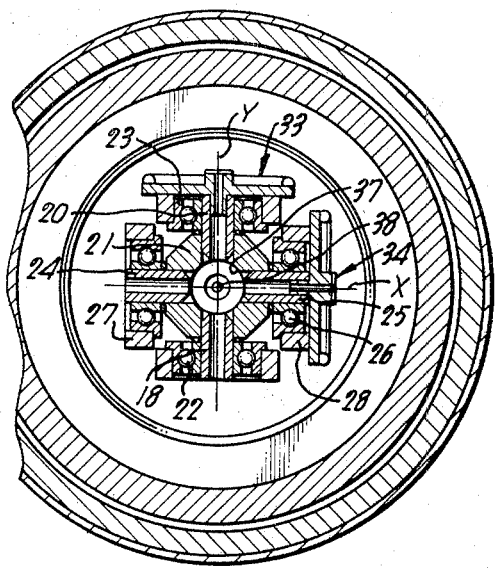
INVENTORS.
EDGAR R. BRASTOW
RICHARD R. SCHABERG
ANDREW VOGE
ATTORNEY.

United States Patent Office 3,434,353
Patented Mar. 25, 1969

3,434,353
RATE GYROSCOPE
Edgar R. Brastow, Woodland Hills, Andrew Voge, Canoga Park, and Richard R. Schaberg, Alhambra, Calif., assignors to Clary Corporation, San Gabriel, Calif., a corporation of California
Filed Sept. 21, 1965, Ser. No. 488,859
Int. Cl. G01c 19/28
U.S. Cl. 74—5.6                 11 Claims

ABSTRACT OF THE DISCLOSURE

A rate gyroscope comprising a rotor capable of being driven at different speeds, means supporting the rotor for movement about a pivot axis perpendicular to its spin axis, a yieldable restraint tending to restrain movement of the rotor about the pivot axis, a pickoff device for emitting a signal responsive to angular acceleration of the rotor about its pivot axis, and a device responsive to the speed of the rotor for modifying such signal.

---

This invention relates to gyroscopes and has particular reference to a rate gyroscope.

A rate gyroscope generally provides an indication, by way of an output signal, which constitutes a measure of the angular rate at which the gyroscope base or housing is being turned about an input axis extending perpendicular to the rotor spin axis.

A yieldable gimbal restraint means, such as a spring, is provided to resist precessing of the gyroscope and such means deflects an amount proportional to the angular rate of input. Such deflection therefore constitutes a measure of the amount of input rate. An equilibrium point is reached when the torque developed by the restraint means balances out the gyroscopic torque developed from the input angular rate.

According to the laws of gyroscopics, the torque (T) =inertia (I)×spin velocity (Ws)×precesion rate (Wp). Since the torque is directly dependent upon the spin velocity, all rate gyroscopes, of which we are aware, heretofore required the use of constant speed motors for driving the rotor throughout the operation of the gyroscope. This presents a problem when using rate gyroscopes to control or indicate the attitude of expendable missiles or the like since it generally requires an electric motor and electric power source. Also, since it is desirable to fire a missile within as short a period as possible, the motor must be capable of rapidly bringing the gyroscope rotor up to operational speed. This, in turn, requires an electric motor of relatively large proportion, as well as a large battery or other power source capable of supplying sufficient power to the motor. This is highly undesirable in the case of missiles where size and weight are at a premium. Any auxiliary motor means for rapidly bringing the motor up to speed obviously increases the need for undesirable weight and volume requirements.

It therefore becomes a principal object of the present invention to provide a rate gyro in which the output is dependent only upon the input angular rate and not upon the spin velocity of the gyroscope rotor.

Another object is to provide a rate gyroscope wherein the gyroscope rotor may be operated at a non-uniform spin velocity without affecting the accuracy of the gyroscope.

Another object is to provide a rate gyroscope in which the gyroscope rotor may be driven by a spring, pyrotechnic or gas driven motor means capable of rapidly bringing the rotor up to operational speed.

Another object is to provide a rate gyroscope in which means are provided to compensate for any changes in spin velocity of the gyroscope rotor.

Another object is to provide a two-axis rate gyroscope having a greater sensitivity to movement about one axis than about another.

The manner in which the above and other objects of the invention are accomplished will be readily understood on reference to the following specification when read in conjunction with the accompanying drawing, wherein:

FIG. 1 is a longitudinal sectional view through a gyroscope embodying a preferred form of the present invention.

FIG. 2 is a transverse sectional view taken along the line 2—2 of FIG. 1.

FIG. 3 is a transverse sectional view through the rotor, illustrating the notched disc.

FIG. 4 is a perspective view of a modified form of the restraint spring.

Figure 5:
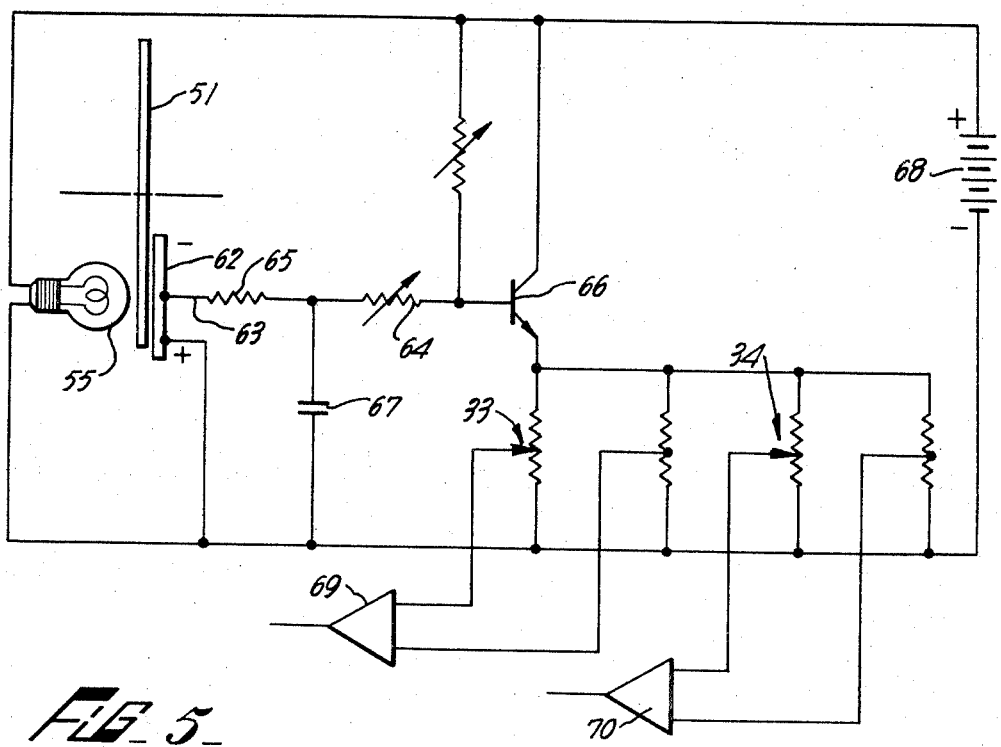
FIG. 5 is a schematic view illustrating the control circuit.
Figure 6:
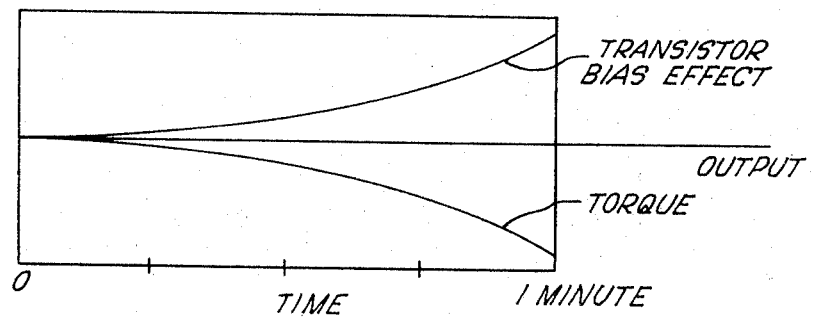
FIG. 6 is a schematic view illustrating in graphic form the response characteristics of the output of the gyroscope.

The gyroscope is similar in certain details to the free gyroscope disclosed and claimed in the copending application of G. E. East et al., Ser. No. 174,899, filed Feb. 21, 1962, now Patent No. 3,247,726, and reference may be had to such application for a complete understanding of such details which are not disclosed herein.

The gyroscope comprises a support generally indicated at 11 in the form of a cylindrical case 12 to which is removably secured an end cap 13.

A hollow rotor 14 is located within the case 12 and is rotatably supported by ball bearings 15 whose inner races are suported by the shank 16 of a bifurcated yoke 17, forming a first gimbal member.

The yoked arms of the member 17 are pivotally supported by coaxial shaft sections 18 and 20 of a universal pivot block 21 (FIGS. 1 and 2) through ball bearings 22 and 23, respectively. The pivot block 21, which forms a second gimbal member is, in turn, provided with coaxial shaft sections 24 and 25, pivotally supported through ball bearings 26 by the yoked arms 27 and 28 of a pedestal 30 which is integrally attached to the end cap 13 by screws 31.

The X and Y axes of the shaft sections 18, 20 and 24, 25 mutually perpendicular to each other and to the spin axis of the rotor, as well as being coincident therewith, so as to permit universal movement of the case 11 about such axes. Also, the center of gravity of the rotor 14 is preferably located at the point of intersection of the X and Y axes and the spin axis, and to effect minor adjustment of such center of gravity, a counter weight is provided in the form of an adjustable screw 32 movable along a threaded hole 133 formed axially in the gimbal member 17.

Variable resistance pickoff devices 33 and 34 (see also FIG. 5) are provided to indicate the movement of the case about the axes X and Y. Such devices are of conventional construction and may comprise potentiometers, each including a resistor base 35 secured to a respective yoke support arm, a suitable resistor element and a wiper arm 36 secured to a respective shaft section of the pivot block 21.

In accordance with the present invention, the pivot blocks 21 has an opening 37 therein through which freely extends an elongated spring member 38 forming the yieldable restraint means of the gyro. The spring member is threadably attached at one end in the threaded hole 133 and is provided with an enlarged head 40 at its opposite end which is slidably mounted for endwise movement in a hole 41 in the pedestal 30. The spring member extends through the intersection of the gimbal axes X and Y and is effective to yieldably restrain movement of the support about both axes.

The spring member may be constructed of symmetrical cross section as shown in FIG. 2 or it may be made of rectangular cross section, as shown in FIG. 4, so as to provide a greater resistance to movement of the support about one gimbal axis than about the other. Therefore, the response to the rate of input about one gimbal axis may be different than the response to the rate of input about the other axis.

In order to dampen out oscillations induced by the spring member 38, dashpot devices, generally indicated at 42 and 43, are provided, one associated with each of the gimbal axes.

Figure 7:
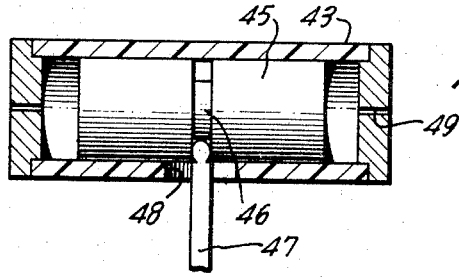
FIG. 7 is a sectional view taken substantially along the line 7—7 of FIG. 1, illustrating one of the dampening devices.

Referring to FIGS. 1 and 7, each dashpot comprises an enclosed cylinder 43 secured to the end cap 13 by a suitable clamp 44. A piston 45 is slideable endwise in the cylinder and has a circumferential slot 46 formed therein to receive one end of a relatively stiff arm 47, the other end of which is attached to a respective one of the arms of the yoke member 17. The arm 47 moves within a slot 48 formed in the cylinder 43, permitting the piston 45 to yieldably restrain movement of the yoke member. Small bleeder holes 49 may be formed in the ends of the cylinder 43 to permit displacement of air or other damping fluid therethrough.

As described in detail in the above East et al. application, the rotor is quickly brought up to operational speed by a spring drive mechanism (not shown herein) through a combined coupling and caging device partially indicated at 50 and is then allowed to coast. Therefore, the speed of the rotor will gradually reduce and according to the present invention means are provided to compensate for such change in speed so as to provide an output which is dependent only upon the input angular rate.

For the purpose of modifying the output of the pickoff devices in accordance with the varying speed of the rotor, a disc 51 of light opaque material is clamped on the rotor between a pair of clamp nuts 52 and 53 threadably attached to the rotor so as to rotate therewith. A plurality of regularly spaced radially extending slits 54 are formed in the disc in the path of a light beam generated by an electric lamp 55. The latter is mounted in a socket 56 secured in the case 12 and transmits a beam of light through a transparent light transmitting rod 57. The beam is formed into a narrow slit as indicated by the dotted lines 58 (FIG. 3) and is received by a similar light transmitting rod 60 on the opposite side of the disc, which rod is suitably supported in the case 12 by a holder 61. The rod 60 transmits the light beam to a photovoltaic type of photocell 62 whose output is connected through a line 63 and a variable resistor 64 to the base of an NPN type transistor 66.

A filter network comprising resistor 65 and capacitor 67 is provided to filter out high frequency ripples caused by the chopping of the light beam. The emitter-collector circuit of the transistor 66 is connected in circuit with a DC power source 68 and in parallel with the potentiometers 33 and 34.

The wiper arms of the potentiometers 33 and 34 are connected to the inputs of respective amplifier circuits 69 and 70 whose outputs may be connected, for example, to the pitch and roll control systems of a missile in which the gyroscope is incorporated or to suitable indicating devices or the like.

The output of the photocell 62 is applied in a direction to reversely bias the transistor so that as the speed of the rotor is reduced the reverse bias is accordingly reduced to permit a greater collector-emitter current to flow, thereby increasing the gain of the pickoffs 33 and 34 to compensate for the reduction in pickoff input angle brought about by the decrease of gyroscopic torque. Accordingly, as the torque is reduced, the effective gain of the pickoffs is increased, causing a substantially straight line output signal. Accordingly, the compensated torque indication output will now equal the inertia (I) times the precession rate ($Wp$), exclusive of the spin velocity.

Although the invention has been described in detail and certain specific terms and languages have been used, it is to be understood that the present disclosure is illustrative rather than restrictive and that changes and modifications may be made without departing from the spirit or scope of the invention as set forth in the claims appended hereto. For example, an inexpensive and non-uniform electric motor could be used in lieu of the spring motor disclosed herein while obtaining the same results.

Having thus described the invention, what is desired to be secured by United States Letters Patent is:

1. A rate gyroscope device comprising a support,
   a rotor,
   means on said support supporting said rotor for rotation about a spin axis and for movement about a second axis perpendicular to said spin axis,
   means forming a yieldable restraint between said first mentioned means and said support,
   a pickoff device connected to said mentioned means,
   said pickoff device giving a signal responsive to angular acceleration of said support about said second axis, and
   a device responsive to the speed of said rotor for modifying said signal.

2. A rate gyroscope device according to claim 1 wherein said pickoff device varies the amplitude of said signal in proportion to the angular acceleration of said support about said second axis, and
   said speed responsive device modifies the amplitude of said signal in inverse proportion to the speed of said rotor.

3. A rate gyroscope device according to calim 1 wherein said speed responsive device comprises a notched disk rotatable by said rotor and photoelectric means controlled by said disk.

4. A rate gyroscope device comprising a support,
   a rotor,
   gimbal means on said support supporting said rotor for rotation about a spin axis and for movement about second and third mutually perpendicular axes,
   means forming a yieldable restraint between said gimbal means and said support,
   a first pickoff device for indicating the movement of said support about said second axis,
   a second pickoff device for indicating the movement of said support about said third axis,
   said pickoff devices giving signals responsive to angular acceleration of said support about said second and third axes, and
   a device responsive to the speed of said rotor for modifying said signals.

5. A rate gyroscope according to claim 4 wherein said restraint means presents greater resistance to movement of said support about said second axis than about said third axis.

6. A rate gyroscope device comprising a support,
   a rotor,
   gimbal means on said support supporting said rotor for rotation about a spin axis and for movement about a second axis perpendicular to said spin axis,
   means forming a yieldable restraint between said gimbal means and said support,
   a variable resistant pickoff device connected to said gimbal means,
   a transistor having its emitter-collector circuit connected in series with said pickoff device,
   a notched disk rotated by said rotor, and
   an electrical device controlled by said disk,
   said electrical device having its output connected to the base of said transistor whereby to bias said transistor in accordance with the speed of said rotor.

7. A rate gyroscope device according to claim 6 wherein said electrical device comprises photoelectric means responsive to light passing through said notched disk.

8. A rate gyroscope device comprising a hollow rotor,
   a first member rotatably supporting said rotor for movement about a spin axis,
   a universal pivot member within said rotor and pivotally supporting said first member for movement about a second axis coincident with said spin axis,
   said second axis extending perpendicular to said spin axis,
   a support,
   said support supporting said universal pivot member for movement about a third axis coincident with said spin axis and said second axis,
   said universal pivot member having an opening therethrough, and
   an elongate spring restraint member extending through said opening,
   said spring member being supported at one end by said first member and at the opposite end by said support,
   said spring member extending at least substantially along said spin axis and being yieldable tarnsversely of its length.

9. A rate gyroscope device according to claim 8 comprising means for securing said spring member at said one end to said first member and means forming an endwise sliding connection between said opposite end and said support.

10. A rate gyroscope device according to claim 8 wherein said spring member has less stiffness in one direction transverse to its length than in another direction.

11. A rate gyroscope device according to claim 8 wherein said spring member has an unsymmetrical cross section whereby to provide greater stiffness in one direction than in another.

References Cited
UNITED STATES PATENTS

| | | | |
|---|---|---|---|
| 2,954,700 | 10/1960 | Deschamps | 74—5.6 X |
| 3,142,183 | 7/1964 | Dane | 74—5.7 |
| 3,176,523 | 4/1965 | Amlie et al. | 74—5.6 |
| 3,222,937 | 12/1965 | Konet | 74—5.6 |
| 3,276,268 | 10/1966 | Brastow et al. | 74—5 |
| 3,290,948 | 12/1966 | East | 74—5.6 X |

C. J. HUSAR, *Primary Examiner.*

U.S. Cl. X.R.

74—5.7